Aug. 14, 1956 H. C. DANIEL 2,758,886
SAFETY VALVE FOR HYDRAULIC BRAKE LINES
Filed Feb. 5, 1953 2 Sheets-Sheet 1

INVENTOR:
HAROLD C. DANIEL.
BY
Eaton + Bell
ATTORNEYS.

Aug. 14, 1956    H. C. DANIEL    2,758,886
SAFETY VALVE FOR HYDRAULIC BRAKE LINES
Filed Feb. 5, 1953    2 Sheets-Sheet 2
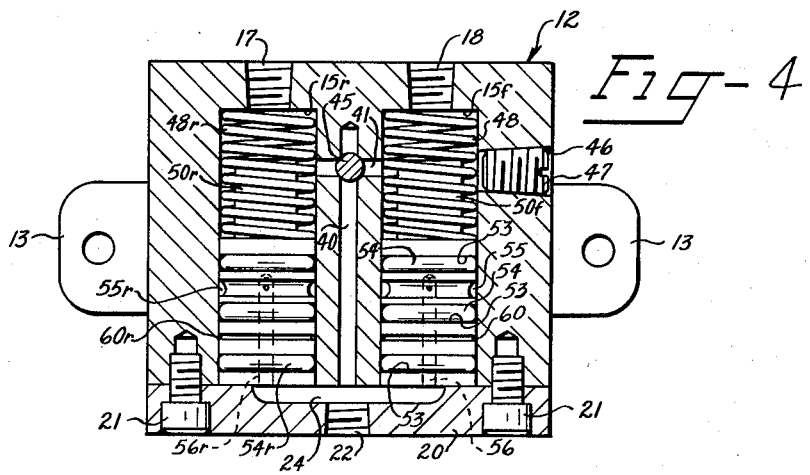
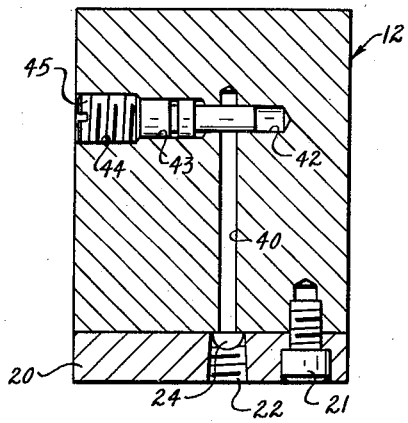
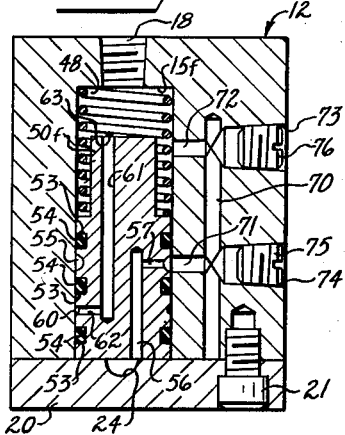
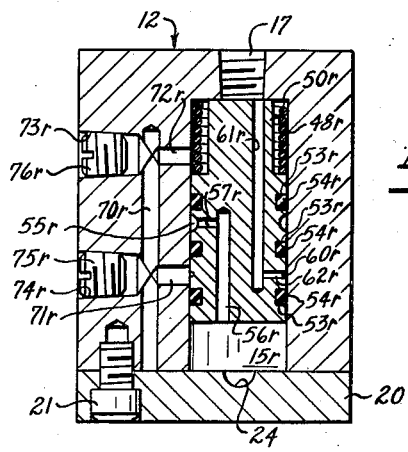
INVENTOR:
HAROLD C. DANIEL.
BY Eaton + Bell
ATTORNEYS.

United States Patent Office 2,758,886
Patented Aug. 14, 1956

2,758,886

SAFETY VALVE FOR HYDRAULIC BRAKE LINES

Harold C. Daniel, Charlotte, N. C., assignor to The Unique Corporation, Charlotte, N. C., a corporation of North Carolina Application February 5, 1953, Serial No. 335,295

2 Claims. (Cl. 303—84)

This invention relates to new and useful improvements and structural refinements in hydraulic brake systems and more especially to a safety device which, while not limited thereto, is particularly advantageous in its application to automobiles and other self propelled vehicles operated by internal combustion engines and particularly to the equipment of such vehicles with brake mechanism which is simultaneously applied to all four wheels.

In the conventional hydraulic braking system now utilized in many vehicles a single master hydraulic cylinder is utilized with interconnected lines leading therefrom to each individual brake cylinder. In this type of system a rupture in an individual brake cylinder or a failure in the line results in the loss of brake fluid with a consequent total loss of braking power to all brake cylinders. This hazardous situation often develops without the knowledge of the operator of the vehicle and becomes apparent to him only when he attempts to apply the brakes.

It is therefore a primary object of this invention to provide a safety device which is designed to be used in conjunction with a conventional hydraulic system, and which will insure adequate emergency braking in the event of failure or rupture of the hydraulic line or the brake cylinder.

It is another object of this invention to provide a safety device adapted to be positioned in a vehicular hydraulic system between the master cylinder and the individual braking devices, which safety device is provided with a pair of movable members adapted to shut off the flow of hydraulic fluid to a particular braking device upon the connection between said safety device and said particular braking device being ruptured or otherwise damaged.

It is another object of this invention to provide an automotive accessory in the form of a hydraulic safety device adapted to be connected in an automotive hydraulic braking system between the master cylinder and the individual braking units, wherein said safety device contains at least two movable pistons, each of which is provided with by-pass means whereby hydraulic fluid flowing from the master cylinder to the individual braking units normally by-passes the pistons, and said safety device being so constructed that upon a rupture occurring in the hydraulic lines between said device and one or more of said braking units, said piston will move to shut off the line to said faulty unit to permit proper operation of the other of said braking units.

More specifically, it is an object of this invention to provide a safety device in the nature of a small valve or block which is adapted to be connected in a conventional braking system between a master cylinder and the lines leading to the front wheels and to the rear wheels of the vehicle. The valve or block is provided with a pair of cylindrical bores connected at one of their ends to the master cylinder and one of said bores being connected at its opposite end to the hydraulic line leading to the front wheels and the other of said bores being connected at its opposite end to the hydraulic line leading to the rear wheels. Each of said bores is provided with a slidable piston therein which pistons are each provided with by-pass means permitting hydraulic fluid to normally by-pass said pistons in flowing from said master cylinders to said front and rear wheels. Upon the line between the front or rear wheels being ruptured, the respective piston therefor will be moved in its cylinder under hydraulic pressure to cut off said by-pass means and to cut off the flow of hydraulic fluid through said lines without affecting the flow of hydraulic fluid or pressure thereof to the other or non-defective lines.

Some of the objects of the invention having been stated other objects will appear as the description proceeds when taken in connection with the accompanying drawings, in which—

Figure 4 is a vertical sectional view of the safety device taken along the line 4—4 in Figure 2, and showing the location of the pistons therein in the absence of pressure in the system;

Figure 5 is a vertical sectional view of the safety device taken along the line 5—5 in Figure 3;

Figure 6 is a vertical sectional view taken substantially along the line 6—6 in Figure 3 showing the by-pass arrangement and showing the piston in the position it occupies within the cylinder before the brakes are applied;

Figure 7 is a vertical sectional view taken substantially along the line 7—7 in Figure 3, and showing the piston in the position it assumes upon a rupture occurring in the rear portion of the hydraulic system.

Figure 1:
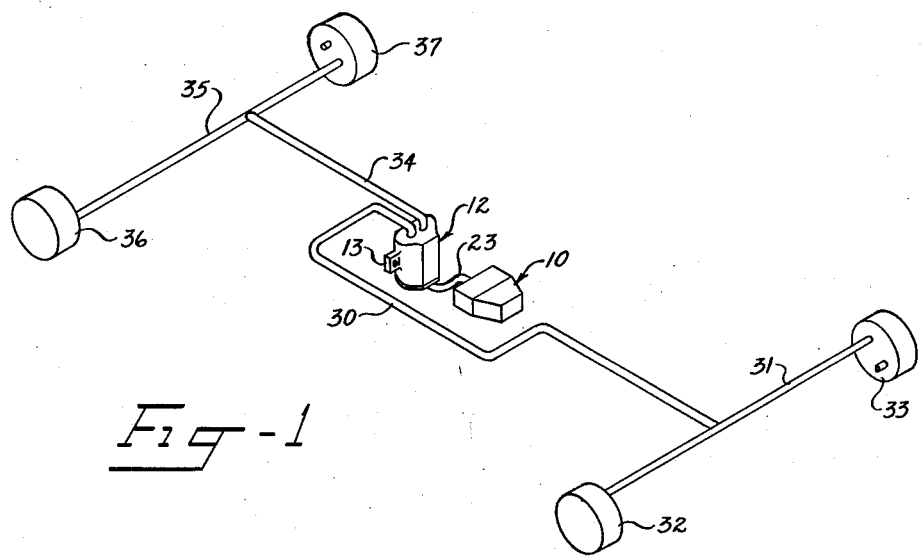
Figure 1 is a diagrammatic view of a hydraulic braking system, showing the present invention associated therewith.
Figure 2:
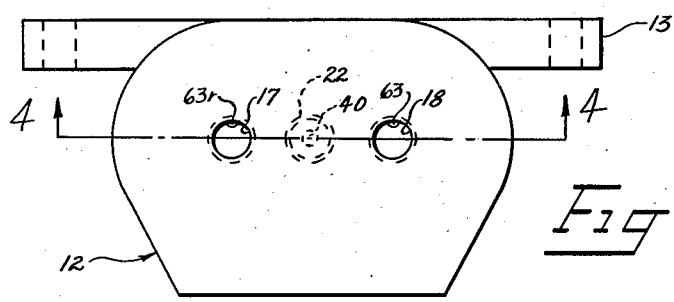
Figure 2 is an enlarged top plan view of the safety device removed from the hydraulic system.
Figure 3:
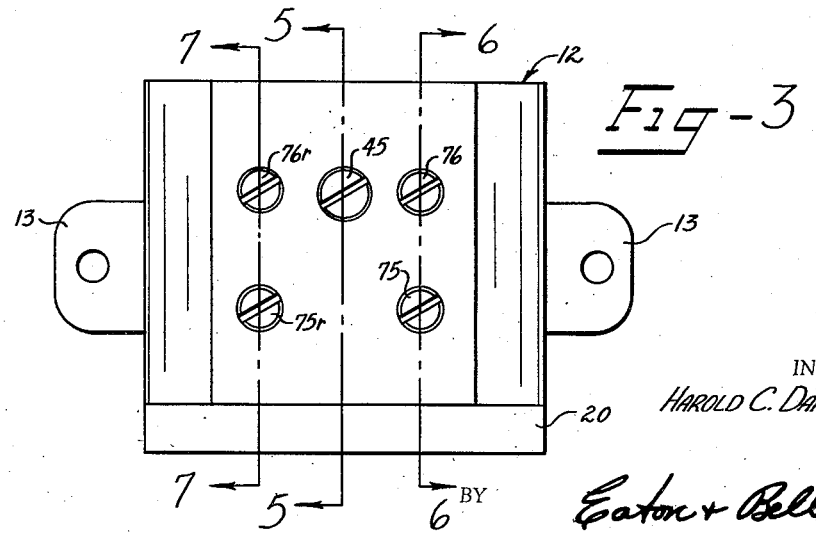
Figure 3 is a front elevation of the safety device.

Referring more specifically to the drawings, the numeral 10 broadly designates a conventional master cylinder or fluid pressure source of hydraulic braking system. It is to be understood that the present invention may be utilized with various types of hydraulic braking systems and the particular vehicular braking system shown is for purposes of illustration only. In the conventional arrangement of a vehicular hydraulic braking system, the master cylinder 10 has connected thereto a plurality of interconnected hydraulic lines which lead to front brake cylinders and to rear brake cylinders associated with the front and rear wheels, respectively. In such a system, upon a rupture of the line at any place therein between the master cylinder and the braking cylinders, the loss of hydraulic fluid will cause a failure of the entire system so that no pressure can be exerted upon any of the individual braking cylinders.

Now, by means of the present invention a safety device or safety valve, broadly designated at 12, is positioned in the hydraulic line between the master cylinder 10 and the individual braking cylinders associated with the wheels of the vehicle. This braking device is preferably formed from a solid body of material such as metal or the like, and the safety device or valve body is adapted to be secured to the chassis of an automotive vehicle or the like, not shown, by any suitable means such as a bracket 13 which may be formed integral with the block 12 or suitably secured thereto. The valve 12 is shown in a substantially vertical position for purposes of illustration, but it is to be understood that in actual practice the valve may occupy any convenient position since its efficiency of operation in no way depends upon its position.

The valve 12 is provided with a pair of spaced cylindrical compartments or bores 15f and 15r therein, which bores or cylinders extend substantially through the body 12 and communicate respectively with one end of threaded bores 18 and 17. The opposite ends of the threaded bores 18 and 17 communicate with the exterior of the body 12 and serve as outlet openings for their respective compartments or cylinders 15f and 15r. The ends of the bores 15f and 15r opposite the bores 18 and 17 are closed by means of a plate 20 suitably secured to the body 12 as by screws 21. The plate 20 is provided with a cavity 24 communicating with an inlet opening 22 which has one end of a conduit or hydraulic line 23 suitably secured therein, the conduit 23 extending to the master cylinder 10 and being connected thereto to permit hydraulic fluid to flow from the master cylinder through the inlet opening 22 and cavity 24 formed in the inner surface of the plate 20. The cavity 24 communicates with one end of each of the cylinders 15f and 15r so as to permit fluid to flow in both of the bore 15f and 15r and to provide communication between said bores at the ends thereof adjacent the master cylinder 10.

A line 30 is connected to the outlet opening 17 and extends to a branch line 31 which is connected at its opposite end to the rear braking cylinders 32 and 33 associated with the rear wheels of the vehicle, not shown. A line 34 is connected to the outlet opening 18 and extends to a branch line 35 which is connected at its opposite ends to the front brake cylinders 36 and 37 associated with the front wheels of the vehicle, not shown.

The valve body 12 is also provided with a relatively small bore 40 positioned in parallel relation to bores 15f and 15r and disposed between said bores, the lower end of the bore 40 communicating with the cavity 24 in the plate 20. A transverse bore 41 is provided in the body portion between the bores 15f and 15r connecting said bores 15f and 15r and extending through and communicating with the bore 40. An additional bore 42 is formed in the body 12 which bore 42 extends across the juncture of bores 40 and 41 and the bore 42 is enlarged as at 43 and again at 44 for reception of a needle valve 45 threadably mounted therein and adapted to close off the bore 41 between the bores 15f and 15r.

The bores 40, 41, 42 and the needle valve 45 are provided to permit the entire hydraulic system to be charged with fluid. In the charging operation, the needle valve 45 is opened to permit hydraulic fluid to flow from the master cylinder through the bores 40 and 41 to fill up the cylinders 15f and 15r and then to flow out through the outlet openings 17 and 18 to fill up the respective lines to the individual braking cylinders which are bled in the usual manner to eliminate any air bubbles in the hydraulic system. After the system is completely charged with fluid, the valve 45 is closed to seal off communication between the bores 15f and 15r through the bore 41.

It will be observed in Figure 4, that in order to form the bore 41 in the solid block 12 an opening or bore 46 is provided which is subsequently suitably closed by a plug 47, said opening 46 serving no purpose in the operation of the safety device 12.

Slidably mounted in the bores 15f and 15r are movable pistons 50f and 50r which pistons serve a double function, namely, the transmitting of pressure on their respective brake cylinders in the absence of a rupture in the lines and when extreme braking power is desired, and, also as a seal against loss of fluid in the event of a rupture in one or more of their respective brake cylinders, or the lines leading thereto, so as to permit full pressure to be exerted on the other half of the system. It will be observed that reduced portions are provided on the upper ends of the pistons 50f and 50r which limit the stroke thereof and accommodate coiled springs 48, 48r, respectively, which normally urge the pistons 50f and 50r away from the bores 18 and 17.

Various bores, grooves and parts are associated with the cylinders 15f and 15r and with pistons 50f and 50r, and as the arrangement is identical in each case only the bores, grooves and parts associated with the cylinder 15f and the piston 50f will be described in detail.

The piston 50f is provided with a plurality of annular grooves 53 in which resilient O-rings 54 are positioned, the O-rings preferably being made of rubber or the like and acting as piston sealing rings. The piston 50f is also provided with an additional annular groove 55, which is not provided with a resilient O-ring, an axial bore 56 extending partially therethrough, and a radial bore 57 communicating with the axial bore 56 and with the annular groove 55, it being observed that the other end of the axial bore 56 communicates with the cavity 24 in the plate 20.

The body 12 is provided with an additional bore 70 of smaller dimensions than the bore 15f and extending in parallel spaced relation to the bore 15f. A first transverse bore 71 bridges the distance between the bore 70 and the bore 15f and a second transverse bore 72, parallel to the first transverse bore 71, also bridges the distance between the bore 70 and the bore 15f. It is necessary to provide openings 73 and 74 in the block 12 in order to form the bores 71 and 72 from an integral piece of material, and these bores 73 and 74 are subsequently closed as by suitable plugs 75 and 76. It will be observed that the bore 70 extends only partially through the block 12 and has one end thereof closed by the plate 20. The bore 71 is so positioned as to communicate with the annular groove 55 in the piston 50f when the piston is at rest against the plate 20, and the bore 72 is so positioned as to communicate with that portion of the cylinder 15f adjacent the outlet opening 18.

It will be observed that a bypass system has been provided around the piston 50f whereby hydraulic fluid flowing from the master cylinder 10 through the line 23 and the inlet opening 22 will move into the cavity 24 and through the bores 56 and 57 into the annular groove 55 and subsequently through the bore 71 and the bore 70. The bore 70 permits fluid to bypass the piston 50f by flowing through the bore 72 and into the part of the large bore or cylinder 15f remote from the plate 20 and thus out of the opening 18 into the line 34 to the front braking cylinders. The annular groove 55 and the bores 71, 70 and 72 also serve as an escape outlet for the excess fluid pressure which builds up through seepage of the fluid around the resilient O-rings adjacent the groove 55.

Also positioned within the piston 50f is another annular groove 60 which is not provided with a resilient O-ring. The piston 50f has a second axial bore 61 extending partially therethrough and is also provided with a second radial bore 62 communicating with the axial bore 61 and with the annular groove 60, it being observed that the other end of the axial bore 61 communicates with the interior of the cylinder 15f adjacent the opening 18 as at 63. The sole purpose of the passageway formed by the annular groove 60 and the bores 61 and 62 within the piston 50f is to provide an escape outlet for the excessive fluid pressure which builds up through seepage around the resilient O-rings 54 adjacent the groove 60. Without such escape means the pressure would tend to force the resilient O-rings or sealing rings 54 out of their normal position in the annular grooves 53, which would in turn, result in leakage of fluid around the walls of the piston 50f and consequent loss of braking power. The annular grooves 55 and 60 and the respective bores 71, 70, 72 and 61 and 62 eliminate this condition by returning such normal seepage to the hydraulic system through the opening 63.

An identical arrangement is provided with respect to the cylinder 15r and the piston 50r, and like parts associated therewith will bear like reference characters with the small letter r associated therewith. In this connection it will be noted that the piston 50r is provided with a plurality of annular grooves 53r, said grooves being fitted with resilient O-rings 54r. The piston 50r is also provided with an annular groove 60r, which groove is not provided with an O-ring but is communicatively connected to a radial bore 62r and an axial bore 61r. The axial bore 61r extends through the upper surface of the piston 50r and communicates with the interior of the cylinder 15r, thus providing a passageway through which excessive fluid pressure can be carried off as it builds up through seepage between the piston 50r and the wall of the cylinder 15r.

An annular groove 55r is also provided in the piston 50r, this groove being communicatively connected to a radial bore 57r and an axial bore 56r both of which are disposed within the piston 50r, the axial bore 56r communicating with the cavity 24 in the plate 20. Bores 71r, 70r, and 72r in the body 12 connect said annular groove 55r to that portion of the cylinder 15r which is remote from the plate 20. It will be noted that by utilizing an annular groove 55r to connect the radial bore 57r in the piston 50r to the transverse bore 71r in the body 12 that a positive connection is insured regardless of the rotation of the piston 50r within the cylinder 15r, so long as the annular groove 55r occupies the same plane as does the bore 71r, which it will during normal operation.

From the foregoing it will be seen that as the brake pedal is depressed, during normal operation, the resulting pressure will force hydraulic fluid from the master cylinder 10 successively through the conduit 23, the inlet opening 22, the cavity 24, the bores 57, 56 and 57r, 56r, and the annular grooves 55 and 55r in their respective pistons 50f and 50r, into their respective bypasses 71, 70, 72 and 71r, 70r, 72r in the body 12, through the upper portions of the cylinders 15f and 15r, out of the openings 17 and 18 into the lines 30 and 34, from where it will travel by way of the branch lines 31 and 35 to the brake cylinders 32, 33, 36 and 37. It should be noted, however, that the bypasses 71, 70, 72 and 71r, 70r, 72r associated with respective cylinders 15f and 15r are not large enough to transmit sufficient volume to the brake cylinders 32, 33, 36 and 37 to provide maximum braking power, the primary purpose of said bypasses being to provide normal braking power and to keep the lines 30, 34, 31 and 35 fully charged with hydraulic fluid by compensating through static pressure for any loss of hydraulic fluid through evaporation or slow leakage. However, when extreme pressure is applied to the brake pedal, the consequent pressure exerted on the lower surfaces of the pistons 50f and 50r is sufficient to force the pistons upwardly within their respective cylinders 15f and 15r far enough to displace the requisite amount of hydraulic fluid normally contained in the upper portions of the cylinders 15f and 15r necessary to effectively actuate the brake cylinders.

Thus the pistons act as a part of the fluid column. Upon release of the brake pedal, the pistons will return to their seats under pressure of the springs 48, 48r and the displaced fluid.

Referring now to Figure 7, it will be observed that upon a rupture occurring in one portion of the hydraulic lines, the particular piston 50f or 50r associated therewith (in this case piston 50r) will move out of the position shown in Figure 4 to substantially the position shown in Figure 7 to cut off the flow of hydraulic fluid into said ruptured lines while permitting continued pressure upon the other half of the system. In Figure 6 the piston 50f is shown in the position normally occupied in a fully charged unbroken system. In Figure 7 the piston 50r is shown in the position it will assume upon the lines 30 or 31 or the brake cylinders 32 or 33 being ruptured to cause loss of fluid.

Upon absence of fluid pressure in the line 30, the piston 50r will move away from the plate 20 to close off the bore 71. Thus, fluid can no longer flow through bores 56 and 57 and the groove 55 into the bore 71, as a short movement of the piston 50r moves the groove 55 out of alinement with the bypass bore 71. This serves to effectively seal off the outlet opening 17 to prevent further loss of fluid from the master cylinder 10 so that the remaining fluid in the master cylinder 10 may be utilized to exert pressure through the other half of the hydraulic braking system.

It is thus seen that I have provided an improved safety device in the form of an accessory for a vehicular hydraulic braking system wherein there is provided a valve body containing two movable pistons positioned within cylinders communicatively connected to the respective front and rear end of the hydraulic braking system. By means of this device, upon a portion of the system being damaged so as to cause loss of fluid, the piston associated therewith will operate to close off that portion of the system and to permit continued pressure upon the other portion of the hydraulic system.

In the drawings and specification, there has been set forth a preferred embodiment of the invention and, although specific terms are employed, they are used in a generic and descriptive sense only, and not for purposes of limitation, the scope of the invention being defined in the claims.

I claim:

1. A safety device for fluid pressure systems comprising an impervious body portion having an inlet opening in one end and having a pair of outlet openings in the other end; said body portion being provided with a pair of cylinders communicating at first ends with said inlet opening and each cylinder communicating at its respective second end with one of the outlet openings; a piston slidably mounted in each of said cylinders, each of said pistons having a plurality of annular grooves theerin, a first group of said annular grooves serving as passageways for fluid pressure and being alternately spaced relative to the remainder of said annular grooves and a sealing ring positioned in each of the remainder of said annular grooves, each of said pistons also having first and second axial bores therein, each of said axial bores being open at one end and closed at the other end, said first axial bore communicating at its open end with said inlet opening and said second axial bore communicating at its open end with the portion of said cylinder adjacent said outlet opening, each of said pistons also having first and second radial bores, said first radial bore extending between said first axial bore and one of said first group of annular grooves, said second radial bore extending between said second axial bore and another of said first group of annular grooves, said pistons having reduced portions on the ends thereof adjacent the outlet openings, resilient springs surrounding said reduced portions and extending between the ends of the cylinders adjacent the outlet openings and said pistons for normally urging said pistons away from said outlet openings; said body being provided with a bypass for each of said cylinders whereby fluid pressure may be transmitted through said inlet opening and out said outlet opening during normal operation without actuating said pistons; and each of said pistons being movable to close its corresponding outlet opening upon a decrease in pressure in said corresponding outlet opening.

2. A structure according to claim 1 wherein said body is also provided with a separate passageway communicating with said inlet opening and with each of said cylinders adjacent said outlet openings, said separate passageway also communicating with the exterior of said body portion at an intermediate point relative to said inlet opening and said outlet opening, means for opening said separate passageway for charging said fluid pressure system to equalize the pressure at said inlet and outlet openings whereby said resilient springs will cause said pistons to move away from said outlet openings, and means for sealing off said separate passageway from communication with said cylinders during normal operation.

References Cited in the file of this patent

UNITED STATES PATENTS

| | | |
|---|---|---|
| 2,097,889 | Miller | Nov. 2, 1937 |
| 2,151,940 | Rumsey | Mar. 28, 1939 |
| 2,166,747 | Best | July 18, 1939 |
| 2,190,872 | George | Feb. 20, 1940 |
| 2,585,511 | Sparks | Feb. 12, 1952 |
| 2,625,951 | Owens | Jan. 20, 1953 |